United States Patent [19]
Neurgaonkar et al.

[11] Patent Number: 5,607,632
[45] Date of Patent: Mar. 4, 1997

[54] METHOD OF FABRICATING PLZT PIEZOELECTRIC CERAMICS

[75] Inventors: Ratnakar R. Neurgaonkar, Thousand Oaks; John R. Oliver, Newbury Park; Jeffrey G. Nelson, Thousand Oaks, all of Calif.

[73] Assignee: Rockwell International Corporation, Seal Beach, Calif.

[21] Appl. No.: 452,927

[22] Filed: May 30, 1995

[51] Int. Cl.$^6$ .................................... C04B 35/49
[52] U.S. Cl. ................. 264/61; 264/65; 264/66; 264/122; 264/125; 501/134
[58] Field of Search ............. 501/134; 264/61, 264/65, 66, 122, 125

[56] References Cited

U.S. PATENT DOCUMENTS

| | | | |
|---|---|---|---|
| 3,871,745 | 3/1975 | Waku et al. | 350/150 |
| 3,971,780 | 11/1975 | Mazdiyasni et al. | 264/61 |
| 4,019,915 | 4/1977 | Miyauchi et al. | 106/73.31 |
| 4,706,163 | 11/1987 | Maher | 361/321 |
| 4,882,078 | 11/1989 | Nishimura et al. | 252/629 |

FOREIGN PATENT DOCUMENTS

| | | |
|---|---|---|
| 62-83368 | 4/1987 | Japan . |
| 5-139828 | 5/1992 | Japan . |
| 7-172837 | 7/1995 | Japan . |

OTHER PUBLICATIONS

Neurgaonkar et al., "Properties of Dense PLZT Piezoelectrics," *Journal of Intelligent Material Systems and Structures*, vol. 4, pp. 272–275 (Apr. 1993).

Primary Examiner—Donald E. Czaja
Assistant Examiner—Sean Vincent

[57] ABSTRACT

PLZT piezoelectric ceramics having the general formula $(Pb_{1-x}La_x)(Zr_yTi_{1-y})_{1-(x/4)}O_3$ are fabricated in a hot forging process using PbO, TiO$_2$, ZrO$_2$, and La$_2$O$_3$ powders as starting materials with Nb$_2$O$_5$ added to provide Nb as a dopant. The ZrO$_2$ and TiO$_2$ powders are mixed at a molar ratio of $y/(1-y)$, calcined at approximately 1300°–1500° C., ball milled in acetone, and evaporated to a dry powder. The mixture of ZrO$_2$ and TiO$_2$ is then combined with the PbO, La$_2$O$_3$, and Nb$_2$O$_5$ powders, and the new mixture is ball milled in acetone, evaporated to a dry powder, calcined at approximately 700°–850° C., and sifted to obtain a particle size of approximately 0.3–2.0 μm. The final PLZT powder is formed into the desired shape by cold pressing followed by sintering at approximately 1000°–1150° C. in oxygen. The PLZT ceramic material is further densified to about 98.5% of the material's theoretical maximum density by heating to approximately 1175°–1275° C. at 800–1200 psi uniaxial pressure. The resulting high performance Nb-doped PLZT piezoelectric ceramic exhibits an average grain size of about 3 μm, a well-defined polarization hysteresis loop, reduced strain hysteresis with the application of a unipolar electric field, a breakdown strength greater than 25 kV/cm, a linear piezoelectric coefficient ($d_{33}$) greater than 750, maximum strain greater than 0.15%, and a fatigue life of at least $10^{10}$ cycles.

19 Claims, 1 Drawing Sheet

METHOD OF FABRICATING PLZT PIEZOELECTRIC CERAMICS

TECHNICAL FIELD

The present invention relates to methods of fabricating piezoelectric materials and, in particular, to a method of fabricating a high performance PLZT piezoelectric ceramic.

BACKGROUND OF THE INVENTION

Performance of piezoelectric actuators and sensors is affected by the microstructural properties of the piezoelectric materials. Commercially available piezoelectric materials, including PZT, PLZT, and PMN-PT, typically exhibit good piezoelectric response but poor fatigue life. Attempts have been made in the past to improve the microstructure of piezoelectric materials using fine-grained precursors with conventional sintering techniques. Although such attempts at microstructural improvement have enhanced some piezoelectric performance characteristics, fatigue life remains low because conventionally sintered ceramics typically have densities of only 90–95% of their theoretical values. Thus, there is a need for new methods of fabricating piezoelectric materials to achieve improved grain orientation, greater density, and extended fatigue life.

SUMMARY OF THE INVENTION

The present invention comprises a method of fabricating a PLZT piezoelectric ceramic. PbO, $TiO_2$, $ZrO_2$, and $La_2O_3$ powders are used as starting materials in a hot forging technique to produce a PLZT piezoelectric ceramic having the formula $(Pb_{1-x}La_x)(Zr_yTi_{1-y})_{1-(x/4)}O_3$. In the steps of the method, $ZrO_2$ and $TiO_2$ powders are mixed at a molar ratio of $y/(1-y)$, calcined at approximately 1300°–1500° C., and ball milled in acetone. After milling, the acetone is evaporated to produce a dry powder. The mixture of $ZrO_2$ and $TiO_2$ is then combined with appropriate amounts of the PbO and $La_2O_3$ powders with $Nb_2O_5$ added to provide 0.5–1.5% $Nb^{5+}$ (mole %) as a dopant, and the new mixture is ball milled in acetone, evaporated to a dry powder, calcined at approximately 700°–850° C., and sifted to obtain a particle size of approximately 0.3–2.0 μm.

The final PLZT powder may be formed into the desired shape by cold pressing (typically at 15,000–25,000 pounds, for example) followed by sintering at approximately 1000°–1150° C. in oxygen. The PLZT ceramic material may be further densified by heating to approximately 1175°–1275° C. at 800–1200 psi to achieve a density of at least 97% (preferably at least 98.5%) of the material's theoretical maximum density.

The PLZT ceramic materials fabricated using the method of the present invention display a strong dielectric permittivity maximum at approximately 155°–165° C., above and below which the permittivity drops rapidly. The ceramic becomes a polar dielectric below about 112°–125° C. with a stable net spontaneous polarization, $P_r$, and a well-defined polarization hysteresis loop (P versus bipolar electric field). A distinguishing feature of these PLZT ceramics, compared with other piezoelectric ceramics, is reduced strain hysteresis with the application of a unipolar electric field. The breakdown strength of the PLZT ceramic material is greater than 25 kV/cm (typically 25–30 kV/cm), well above the typical operating electric field strengths that are normally used for piezoelectric actuation. Furthermore, the linear piezoelectric coefficient ($d_{33}$), the maximum strain (%), and the fatigue life (cycles) of the Nb-doped PLZT ceramics produced by the present method are significant advances over known piezoelectric materials.

A principal object of the invention is fabrication of high performance piezoelectric materials that m have a long fatigue life. A feature of the invention is a method of fabricating Nb-doped PLZT piezoelectric ceramics having high density and fine grain microstructure. An advantage of the invention is PLZT piezoelectric ceramics that exhibit a fatigue life on the order of $10^{10}$ cycles and above.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
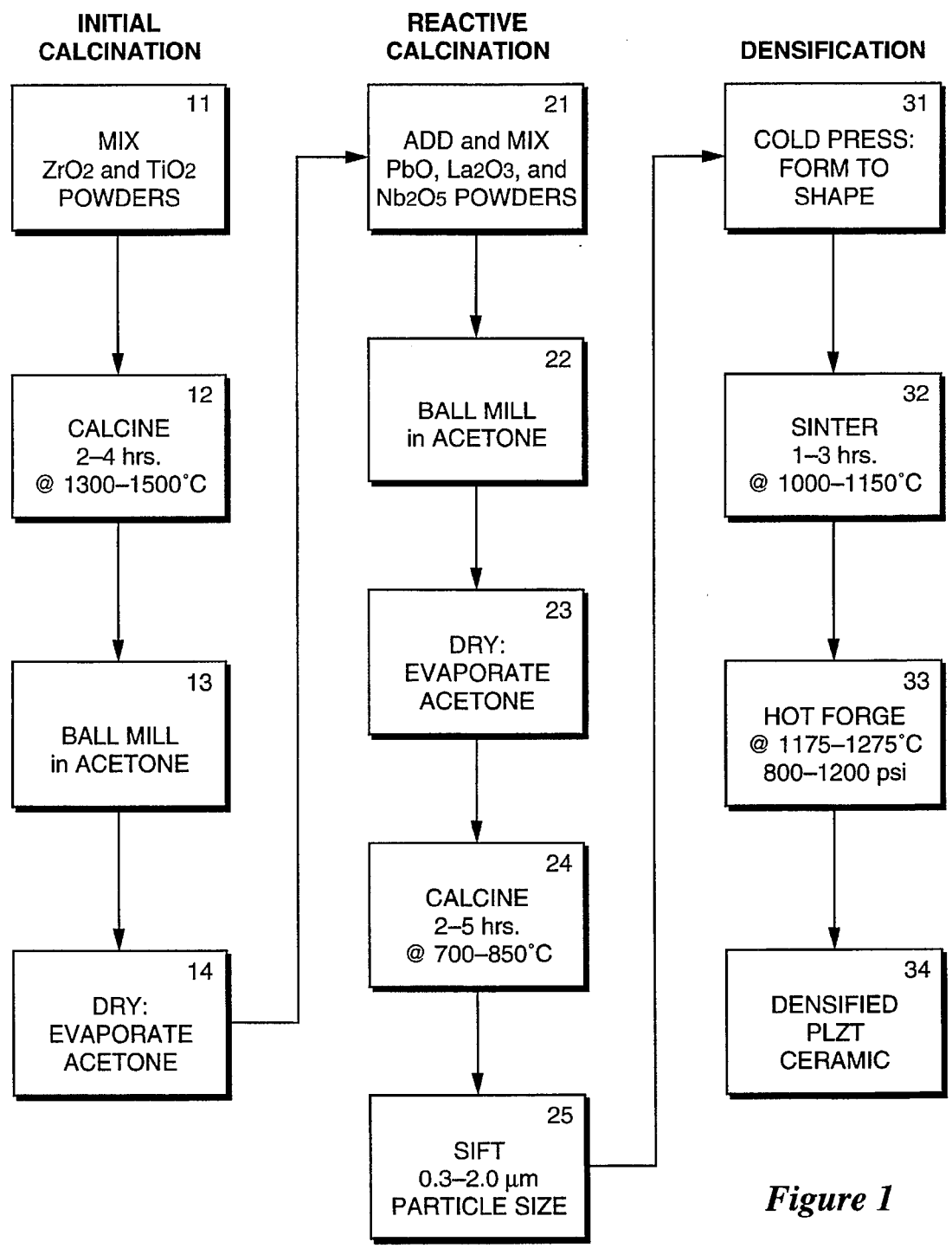
FIG. 1 is a process flow chart for the present method of fabricating PLZT piezoelectric ceramics.

The present invention comprises a method of fabricating a PLZT piezoelectric ceramic. The object is to produce high performance piezoelectric materials having improved microstructure and high density for a long fatigue life. In the method, a PLZT piezoelectric ceramic having the general formula $(Pb_{1-x}La_x)(Zr_yTi_{1-y})_{1-(x/4)}O_3$ is fabricated by a hot forging technique using PbO, $TiO_2$, $ZrO_2$, and $La_2O_3$ powders as starting materials with $Nb_2O_5$ added to provide 0.5–1.5% $Nb^{5+}$ (mole %) as a dopant.

The formula of a preferred PLZT composition (PLZT (7/60/40), where x=0.07 and y=0.60) is $Pb_{0.93}La_{0.07}(Zr_{0.60}Ti_{0.40})_{0.9825}O_3$. To fabricate this PLZT ceramic using the present method, the precursor materials may be mixed by weight, as in the following example: PbO: 163 gm.; $La_2O_3$: 9 gm.; $ZrO_2$: 56 gm.; $TiO_2$: 24 gm; and $Nb_2O_5$: 1 gm.

The first stage of producing PLZT (7/60/40) involves initial reactive calcination of $ZrO_2$ and $TiO_2$, as shown in the first column of FIG. 1. In the method, as indicated at step 11 of FIG. 1, $ZrO_2$ and $TiO_2$ powders are mixed at a molar ratio of $y/(1-y)$, which is a ratio of 60/40 (or approximately 70/30 weight %) for the example of PLZT (7/60/40). The mixture may be mixed in a Nalgene bottle for about 5 minutes and then placed in a platinum crucible. The mixture of $ZrO_2$ and $TiO_2$ powders is then calcined at approximately 1300°–1500° C. for about 2–4 hours, as shown at step 12. After calcination, the powder mixture is ball milled in acetone for about 40–50 hours, as shown at step 13. After milling, the acetone is evaporated to produce a dry powder at step 14.

The next stage of the process involves reactive calcination of the PLZT powder mixture, as shown in the second (middle) column of FIG. 1. The calcined and milled mixture of $ZrO_2$ and $TiO_2$ from the first stage of the process is combined with appropriate amounts of the PbO, $La_2O_3$, and $Nb_2O_5$ powders (such as indicated in the example above), as shown at step 21. The PLZT mixture is ball milled in acetone for about 40–50 hours at step 22 and evaporated to a dry powder at step 23. The milled PLZT powder mixture is then calcined at approximately 700°–850° C. for about 2–5 hours at step 24 and sifted (e.g., through a screen) at step 25 to obtain a particle size of approximately 0.3–2.0 μm.

The final stage of the process is densification of the PLZT powder mixture, as shown in the third (right-hand) column of FIG. 1. The milled and calcined PLZT powder can be formed into a desired shape, such as a 1.5 inch diameter disk comprising about 150 grams of powder, for example, by cold pressing at about 15,000–25,000 pounds, as indicated at step 31. The formed shape is then sintered (for about 1–3 hours at approximately 1000°–1150° C. in oxygen, for example) at step 32 to produce a PLZT ceramic. The PLZT ceramic material can be further densified by hot forging, as shown in step 33, by heating to approximately 1175°–1275° C. at 800–1200 psi uniaxial pressure for about 1–3 hours to produce a densified Nb-doped PLZT ceramic, as indicated at step 34, having a final average grain size of about 3 µm and a density of at least 97% (preferably at least 98.5%) of the material's theoretical maximum density. Example properties of Nb-doped PLZT (7/60/40) produced by the foregoing method are listed in Table 1 below.

TABLE 1

| Property | Range |
|---|---|
| Ferroelectric Transition, $T_c$ (°C.) | 112–125° C. |
| Dielectric Constant, | 4000–5500 |
| Dielectric Losses, % | <7% |
| Spontaneous Polarization, $P_r$ (µC/cm$^2$) | 30–33 |
| Linear Piezoelectric Coefficient, $d_{33}$ (pC/N) | 750–1060 |
| Maximum Strain, % | 0.16–0.22% |
| Fatigue Life, cycles | >10$^{10}$ |

The PLZT (7/60/40) ceramic material fabricated using the method of the present invention displays a strong dielectric-permittivity maximum at approximately 155°–160° C., above and below which the permittivity drops rapidly. PLZT (7/60/40) becomes a polar dielectric below about 112°–125° C., exhibiting a stable net spontaneous polarization, Pr, and a well-defined polarization hysteresis loop (P versus bipolar electric field). As compared with conventional piezoelectric ceramics, Nb-doped PLZT ceramics produced by the process of the present invention have reduced strain hysteresis with the application of a unipolar electric field. In addition, the breakdown strength of these PLZT ceramic materials is greater than about 25 kV/cm (generally 25–30 kV/cm), well above the typical operating electric field strengths that are normally used for piezoelectric actuation. Furthermore, the linear piezoelectric coefficient ($d_{33}$), the maximum strain (%), and the fatigue life (cycles) of the Nb-doped PLZT ceramic materials produced by the present method are significant advances over known piezoelectric materials.

Although the present invention has been described with respect to specific embodiments thereof, various changes and modifications can be carded out by those skilled in the art without departing from the scope of the invention. Therefore, it is intended that the present invention encompass such changes and modifications as fall within the scope of the appended claims.

We claim:

1. A method of fabricating a PLZT piezoelectric material, comprising the steps of:

initially calcining a mixture of $ZrO_2$ and $TiO_2$ powders;

milling said calcined mixture of $ZrO_2$ and $TiO_2$ powders;

mixing PbO and $La_2O_3$ powders with said milled $ZrO_2$ and $TiO_2$ powders to form a PLZT powder;

adding $Nb_2O_5$ powder to said PLZT powder to provide Nb as a dopant;

milling, calcining, and sifting said doped PLZT powder to obtain a particle size of approximately 0.3–2.0 µm;

cold pressing said sifted PLZT powder into a desired shape; and sintering and densifying said cold pressed PLZT powder to form said PLZT ceramic material having a density of at least 97% of the material's theoretical maximum density.

2. The method of claim 1, further comprising the step of mixing said powders of $ZrO_2$ and $TiO_2$ at a ratio of $y/(1-y)$ to produce said PLZT ceramic material having the general formula $(Pb_{1-x}La_x)(Zr_yTi_{1-y})_{1-(x/4)}O_3$.

3. The method of claim 1, wherein said milling steps comprise ball milling in acetone followed by evaporating the acetone to dry said milled powders.

4. The method of claim 1, wherein said step of adding $Nb_2O_5$ comprises adding an amount of $Nb_2O_5$ powder to provide 0.5–1.5% $Nb^{5+}$ (mole %) as said dopant.

5. The method of claim 1, wherein the step of calcining said mixture of $ZrO_2$ and $TiO_2$ powders comprises calcining said mixture at 1300°–1500° C. for 2–4 hours.

6. The method of claim 1, wherein the step of calcining said doped PLZT powder comprises calcining at 700°–850° C. for 2–5 hours.

7. The method of claim 1, wherein the step of sintering said cold pressed PLZT powder comprises sintering at 1000°–1150° C. for 1–3 hours.

8. The method of claim 1, wherein the step of densifying said cold pressed PLZT powder comprises hot forging at 1175°–1275° C. and 800–1200 psi for 1–3 hours.

9. A method of fabricating a PLZT piezoelectric material having the general formula $(Pb_{1-x}La_x)(Zr_yTi_{1-y})_{1-(x/4)}O_3$, comprising the steps of:

mixing powders of $ZrO_2$ and $TiO_2$ at a ratio of $y/(1-y)$;

initially calcining said mixture of $ZrO_2$ and $TiO_2$ powders;

ball milling said calcined mixture of $ZrO_2$ and $TiO_2$ powders in acetone and evaporating to form a dry powder mixture;

mixing PbO and $La_2O_3$ powders with said milled $ZrO_2$ and $TiO_2$ powders to form a PLZT powder;

adding $Nb_2O_5$ powder to said PLZT powder to provide Nb as a dopant;

ball milling said doped PLZT powder in acetone and evaporating to a dry PLZT powder;

calcining said milled PLZT powder and sifting to obtain a particle size of approximately 0.3–2.0 µm;

cold pressing said sifted PLZT powder to form a desired shape;

sintering said cold pressed PLZT powder in oxygen to form said PLZT ceramic material; and hot forging said PLZT ceramic material to achieve a density of at least 97% of the material's theoretical maximum density.

10. The method of claim 9, wherein the step of adding $Nb_2O_5$ comprises adding an amount of said $Nb_2O_5$ powder to provide 0.5–1.5% $Nb^{5+}$ (mole %) as said dopant.

11. The method of claim 9, wherein step of calcining said mixture of $ZrO_2$ and $TiO_2$ powders comprises calcining at approximately 1300°–1500° C. for 2–4 hours.

12. The method of claim 11, wherein the step of calcining said doped and milled PLZT powder comprises calcining at approximately 700°–850° C. for 2–5 hours.

13. The method of claim 12, wherein the step of sintering said cold pressed PLZT powder comprises sintering at approximately 1000°–1150° C. in oxygen for 1–3 hours.

14. The method of claim 13, wherein the step of hot forging said PLZT ceramic material comprises hot forging at approximately 1175°–1275° C. and 800–1200 psi for 1–3 hours.

15. A method of fabricating a Nb-doped PLZT piezoelectric ceramic material having the general formula $(Pb_{1-x}La_x)(Zr_yTi_{1-y})_{1-(x/4)}O_3$, comprising the steps of:

mixing powders of $ZrO_2$ and $TiO_2$ at a ratio of $y/(1-y)$;

initially calcining said mixture of $ZrO_2$ and $TiO_2$ powders;

ball milling said calcined mixture of $ZrO_2$ and $TiO_2$ powders in acetone and evaporating to form a dry powder mixture;

mixing PbO and $La_2O_3$ powders with said milled $ZrO_2$ and $TiO_2$ powders to form a PLZT powder;

adding $Nb_2O_5$ powder to said PLZT powder to provide 0.5–1.5% $Nb^{5+}$ (mole %) as a dopant;

ball milling said doped PLZT powder in acetone and evaporating to form a dry milled PLZT powder;

calcining said dry milled PLZT powder and sifting to obtain a particle size of approximately 0.3–2.0 µm;

cold pressing said sifted PLZT powder to form a desired shape;

sintering said cold pressed PLZT powder in oxygen to form said Nb-doped PLZT ceramic material; and hot forging said Nb-doped PLZT ceramic material to achieve a density of at least 98% of the material's theoretical maximum density.

16. The method of claim 15, wherein the step of calcining said mixture of $ZrO_2$ and $TiO_2$ powders comprises calcining at approximately 1300°–1500° C. for 2–4 hours.

17. The method of claim 16, wherein the step of calcining said dry milled PLZT powder comprises calcining at approximately 700°–850° C. for 2–5 hours.

18. The method of claim 17, wherein the step of sintering said cold pressed PLZT powder comprises sintering at approximately 1000°–1150° C. in oxygen for 1–3 hours.

19. The method of claim 18, wherein the step of hot forging said Nb-doped PLZT ceramic material comprises hot forging at approximately 1175°–1275° C. and 800–1200 psi for 1–3 hours.

* * * * *